United States Patent
Rao et al.

(10) Patent No.: US 11,720,280 B2
(45) Date of Patent: Aug. 8, 2023

(54) STORAGE SYSTEM AND METHOD FOR IMPROVING UTILIZATION OF A COMMUNICATION CHANNEL BETWEEN A HOST AND THE STORAGE SYSTEM

(71) Applicant: Western Digital Technologies, Inc., San Jose, CA (US)

(72) Inventors: Abhijit K Rao, Bengaluru (IN); Avinash Sharma, Jharkhand (IN); Bala Siva Kumar Narala, Andhra Pradesh (IN); Kartheshwar Shanmuga Sundaram, Nadu (IN)

(73) Assignee: Western Digital Technologies, Inc., San Jose, CA (US)

( * ) Notice: Subject to any disclaimer, the term of this patent is extended or adjusted under 35 U.S.C. 154(b) by 54 days.

(21) Appl. No.: 16/717,469

(22) Filed: Dec. 17, 2019

(65) Prior Publication Data
US 2021/0181980 A1  Jun. 17, 2021

(51) Int. Cl.
*G06F 3/06* (2006.01)

(52) U.S. Cl.
CPC .......... *G06F 3/0659* (2013.01); *G06F 3/0607* (2013.01); *G06F 3/0611* (2013.01); *G06F 3/0653* (2013.01); *G06F 3/0679* (2013.01)

(58) Field of Classification Search
CPC .... G06F 3/0659; G06F 3/0607; G06F 3/0611; G06F 3/0653; G06F 3/0679
USPC .......................................................... 711/154
See application file for complete search history.

(56) References Cited

U.S. PATENT DOCUMENTS

| | | | |
|---|---|---|---|
| 9,003,071 B2 | 4/2015 | Liu | |
| 10,019,161 B2 | 7/2018 | Sharifie et al. | |
| 10,089,255 B2 | 10/2018 | Rui et al. | |
| 10,146,729 B2 | 12/2018 | Jiminez et al. | |
| 2012/0290707 A1* | 11/2012 | Ennis | H04L 43/10 709/224 |
| 2016/0188510 A1 | 6/2016 | Singh et al. | |
| 2016/0321012 A1* | 11/2016 | Clark | G06F 3/061 |
| 2017/0357609 A1* | 12/2017 | Long | G06F 13/385 |
| 2018/0217951 A1* | 8/2018 | Benisty | G06F 13/1642 |
| 2018/0321945 A1* | 11/2018 | Benisty | G06F 13/385 |
| 2019/0317697 A1* | 10/2019 | La Fratta | G06F 3/0604 |
| 2020/0363985 A1* | 11/2020 | Gokam | G06F 3/0611 |

\* cited by examiner

*Primary Examiner* — Gautam Sain
(74) *Attorney, Agent, or Firm* — Crowell & Moring LLP

(57) ABSTRACT

A storage system and method for improving utilization of a communication channel between a host and the storage system are provided. In one embodiment, a method is provided that is performed in a storage system in communication with a host via a communication channel. The method comprises determining utilization of the communication channel; and selecting a command for execution from a queue based at least in part on the determined utilization of the communication channel. The command can be selected also based on at least one other factor and based on a weighted priority-based function. Other embodiments are provided.

14 Claims, 11 Drawing Sheets

STORAGE SYSTEM AND METHOD FOR IMPROVING UTILIZATION OF A COMMUNICATION CHANNEL BETWEEN A HOST AND THE STORAGE SYSTEM

BACKGROUND

In some storage system environments, such as those operating under the Non-Volatile Memory Express (NVMe) specification, a host stores a queue of commands (e.g., read commands and/or write commands), and the storage system selects commands from the queue for execution. When choosing which command to select from the queue, some storage systems select the command that would result in bandwidth being maximized. Also, some storage systems use a weighted priority-based scheme for host command selection.

DETAILED DESCRIPTION

Overview

Figure 1A:
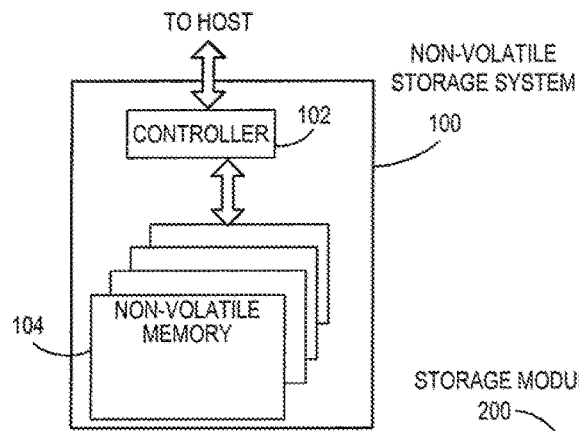
FIG. 1A is a block diagram of a non-volatile storage system of an embodiment.

By way of introduction, the below embodiments relate to a storage system and method for improving utilization of a communication channel between a host and the storage system. In one embodiment, a method is provided that is performed in a storage system in communication with a host via a communication channel. The method comprises determining utilization of the communication channel; and selecting a command for execution from a queue based at least in part on the determined utilization of the communication channel.

In some embodiments, the command is selected also based on at least one other factor in addition to the determined utilization of the communication channel.

In some embodiments, the command is selected using a weighted priority-based function based on the determined utilization of the communication channel and the at least one other factor.

In some embodiments, the method further comprises using the weighted priority-based function to calculate a value for each command in the queue; and storing the calculated values in a table; wherein a command is selected by selecting the command in the table associated with a highest calculated value.

In some embodiments, the at least one other factor comprises one or more of the following: workload, length of command, command priority, type of command, aging of command, and command dependency with other commands.

In some embodiments, the determining and selecting are performed in a hardware component in a controller of the storage system.

In some embodiments, the determining and selecting are performed in firmware in the storage system.

In some embodiments, the communication channel comprises a full duplex communication channel.

In some embodiments, the communication channel comprises a peripheral component interconnect express (PCIe) interface.

In another embodiment, a storage system is provided comprising a memory and a controller. The controller is configured to determine utilization of a bus configured to place the storage system in communication with a host; and select a command for execution based at least in part on the determined utilization of the bus.

In some embodiments, the command is selected also based on at least one other factor in addition to the determined utilization of the bus.

In some embodiments, the at least one other factor comprises one or more of the following: workload, length of command, command priority, type of command, aging of command, and command dependency with other commands.

In some embodiments, the command is selected using a Command Priority Factor function and a Command Priority Factor table.

In some embodiments, the bus comprises a full duplex bus.

In some embodiments, the bus comprises a peripheral component interconnect express (PCIe) interface.

In some embodiments, the memory comprises a three-dimensional memory.

In some embodiments, the storage system is configured to be integrated in the host.

In some embodiments, the storage system is configured to be removably connected with the host.

In another embodiment, a storage system is provided comprising a memory; an interface configured to communicate with a host; means for determining utilization of the interface; and means for selecting a command for execution based at least in part on the determined utilization of the interface.

In some embodiments, the command is selected also based on at least one other factor in addition to the determined utilization of the interface.

Other embodiments are possible, and each of the embodiments can be used alone or together in combination. Accordingly, various embodiments will now be described with reference to the attached drawings.

Embodiments

Figure 1B:
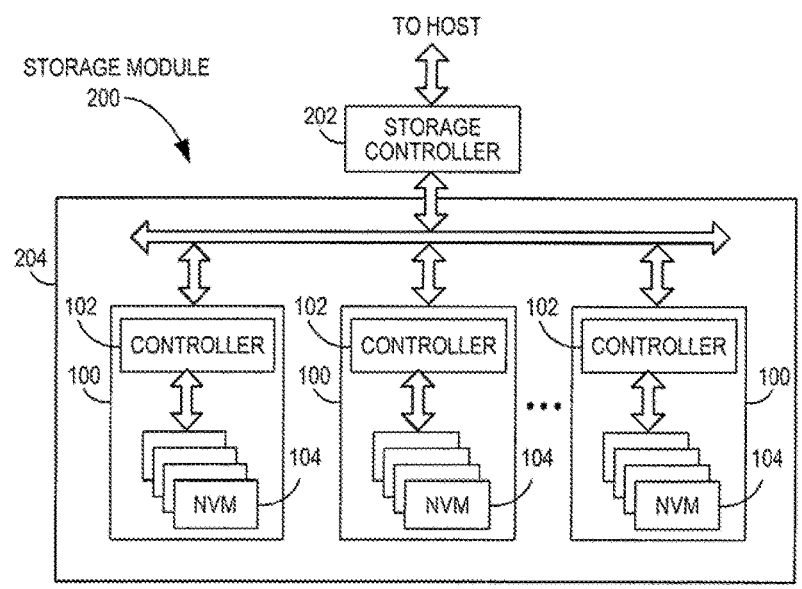
FIG. 1B is a block diagram illustrating a storage module of an embodiment.
Figure 1C:
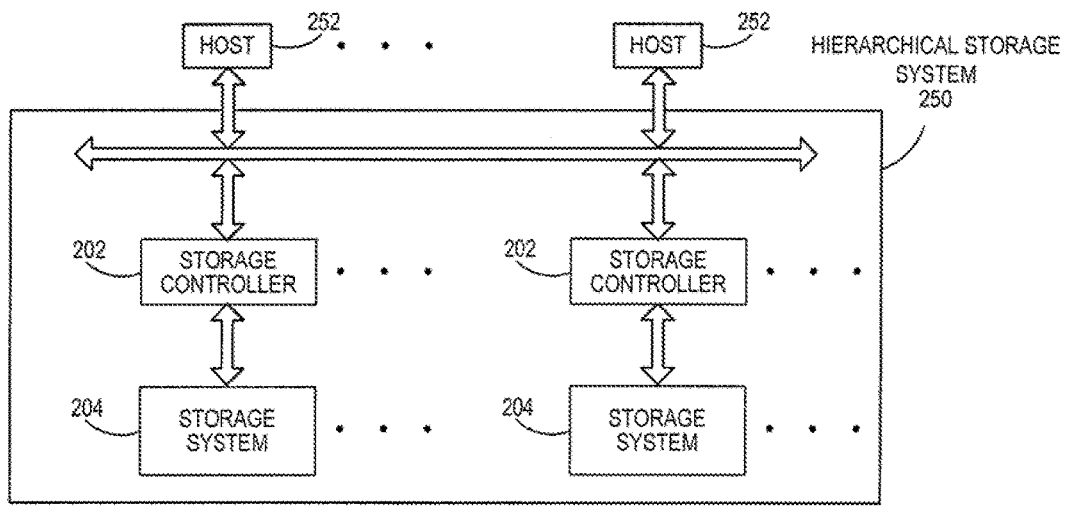
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
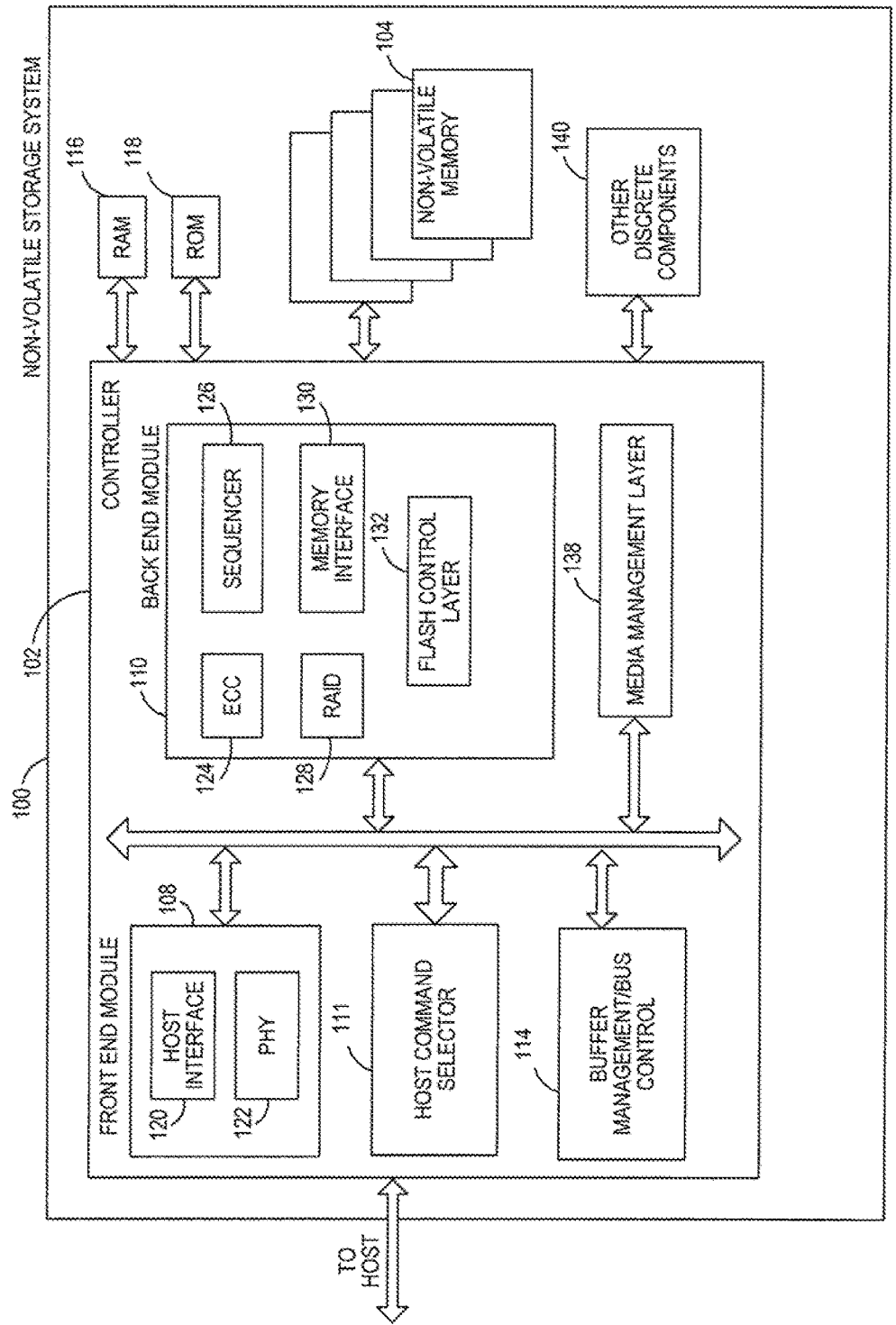
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a flash translation layer (FTL) host command selector 111, which is discussed in more detail below, and can be implemented in hardware or software/firmware. The host command selector 111 can be configured to perform the algorithms and methods discussed below and shown in the attached drawings.

Referring again to modules of the controller 102, a buffer manager/bus controller 114 manages buffers in random access memory (RAM) 116 (e.g., two-terminal tunnelling random access memory (TRAM)) and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
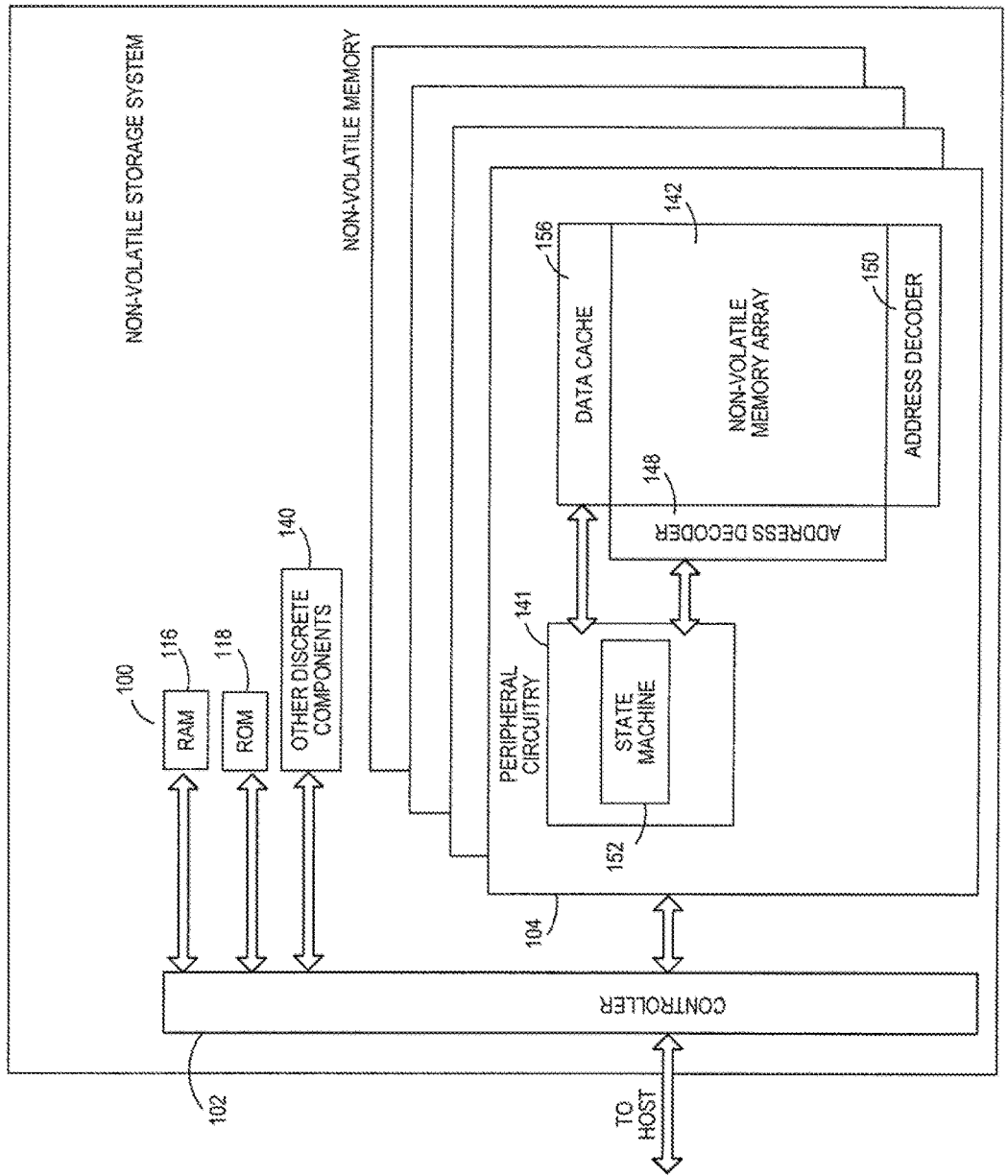
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, in some storage system environments, such as those operating under the Non-Volatile Memory Express (NVMe) specification, a host stores a queue of commands (e.g., read commands and/or write commands), and the storage system selects commands from the queue for execution. Other protocols can be used, and the below claims should not be limited to NVMe unless that feature is expressly recited therein.

As also mentioned above, the host and storage system 100 communicate via an interface or communication channel. The terms interface, communication channel, bus, and lane will be used interchangeably herein to refer to the mechanism through which the host and storage system 100 communicate with one another. While any suitable communication channel can be used with these embodiments, the below examples will be discussed in terms of a peripheral component interconnect express (PCIe) interface. Again, other communication channels can be used (such as, but not limited to, a Small Computer System Interface (SCSI) bus and a Universal Flash Storage (UFS) bus), and the below claims should not be limited to a PCIe interface unless that feature is expressly recited therein.

PCIe supports full duplex communication, which allows data flow both upstream and downstream simultaneously (i.e., communication from the host to the storage system 100 can take place at the same time as communication from the storage system 100 to the host). With NVMe protocol, depending on the workload, data movement can happen in either direction. A single lane PCIe 3.0 (Gen 3) bus provides throughput of ~1 GB/second in one simplex direction and an aggregate of 2 GB/s. Most commonly, flash translation layers (FTLs) are designed to maximize the random read/write input-output operations per second (IOPS). For the measurement of IOPS, a storage system is subjected to workloads of pure input-output (I/O)(only reads or write commands) in nature. For storage systems whose queue depth is large, many commands may not get processed even if the upstream or downstream lane could be free. Although NVMe allows out of order execution, PCIe lane usage is not considered during command selection. Under such workloads, only half of the host bandwidth is utilized. However, real-life workloads on enterprise solid-state drives (SSDs), smartphones, and laptops are mixed I/O.

In order to understand the current utilization of PCIe lanes on NVMe-based storage systems, experiments on utilization of PCIe lanes were performed using a modelling tool to model system architecture on various NVMe/PCIe storage systems. The experimental data was derived based on mixed I/O workload. The I/O workloads were categorized as: (A) 50% write commands and 50% read commands; (B) 70% write commands and 30% read commands; and (C) 30% write commands and 70% read commands. An overlapping and non-overlapping read write address range was chosen as part of the experiment.

Figure 3:
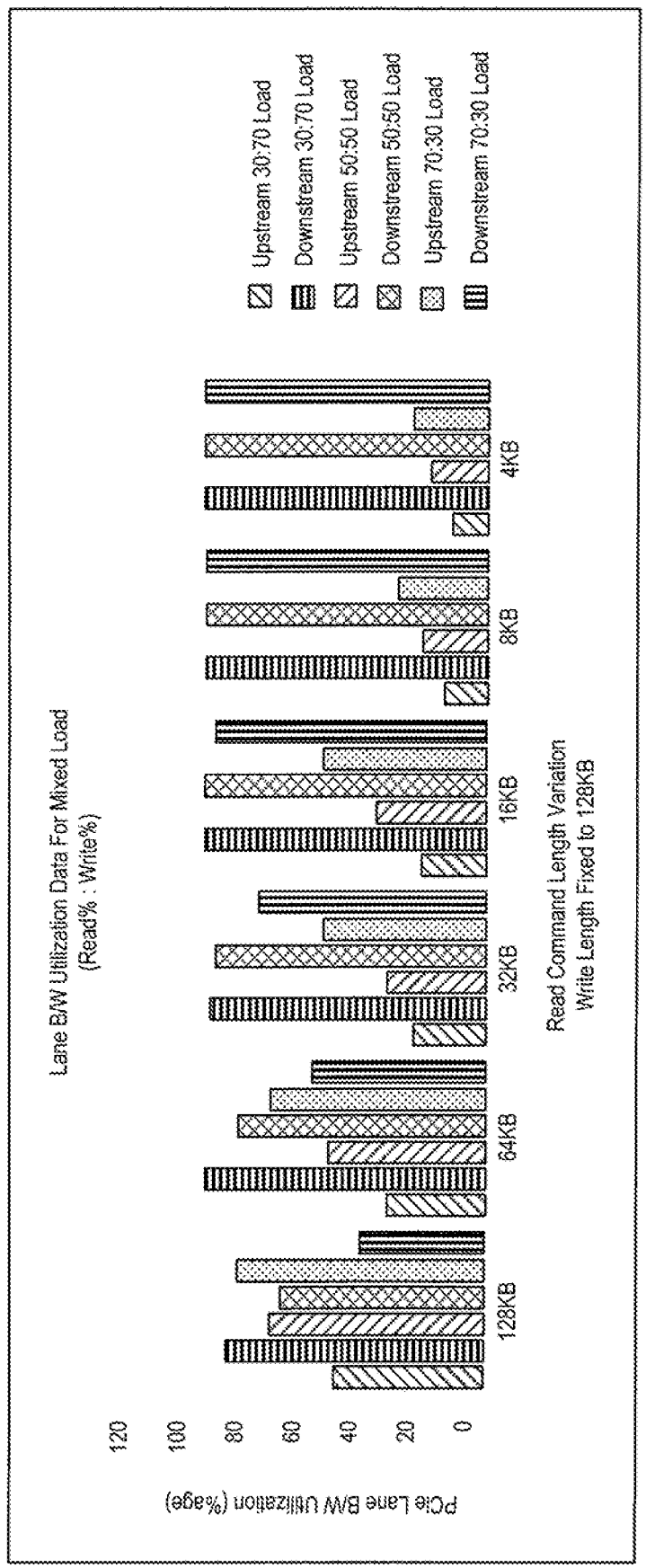
FIG. 3 is a graph of an embodiment showing lane bandwidth utilization for a mixed load with a write length fixed to 128 KB and a varying read length.
Figure 4:
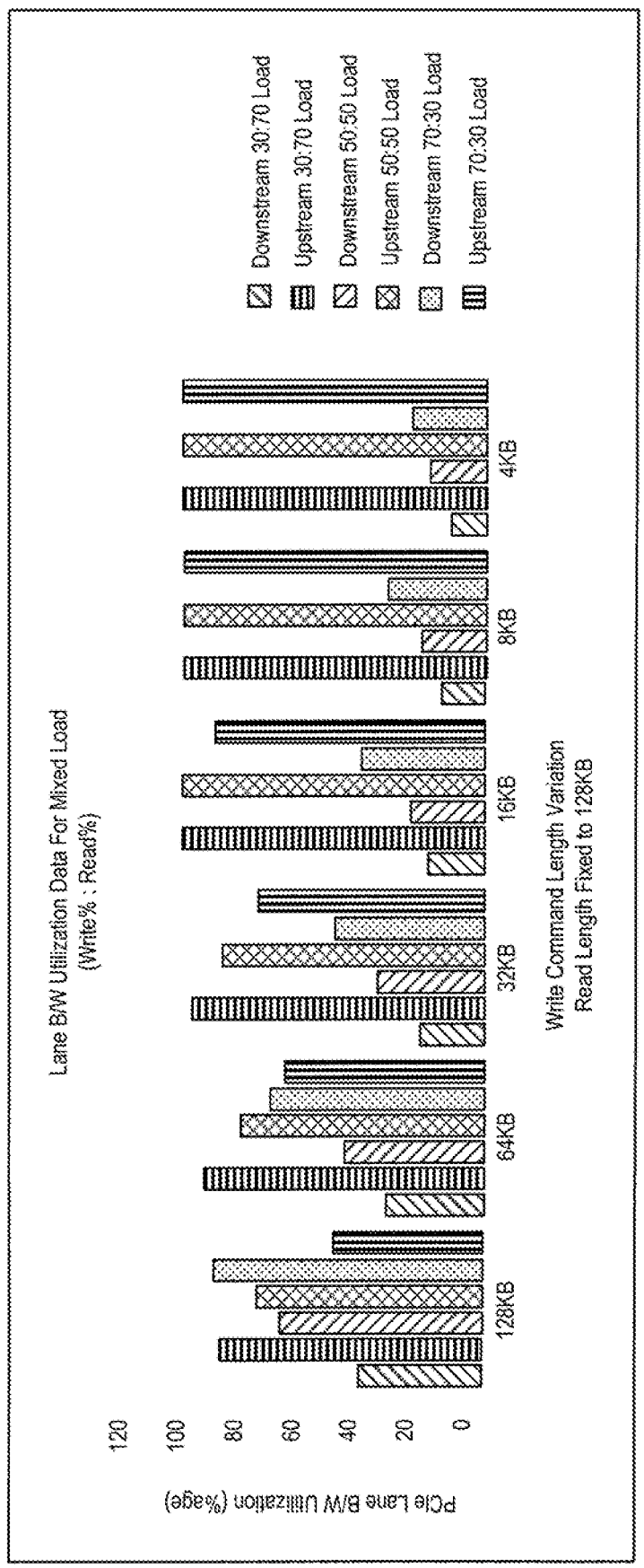
FIG. 4 is a graph of an embodiment showing lane bandwidth utilization for a mixed load with a read length fixed to 128 KB and a varying write length.

FIGS. 3 and 4 show the results of those experiments. FIG. 3 is graph of an embodiment showing lane bandwidth utilization for a mixed load with a write length fixed to 128 KB and a varying read length. FIG. 4 is graph of an embodiment showing lane bandwidth utilization for a mixed load with a read length fixed to 128 KB and a varying write length. The information in these graphs provides several insights. For example, in each model of I/O work load (A, B, and C), PCIe lanes both upstream and downstream are not 100% utilized even when the memory (e.g., NAND) utilization is less than 100%. Also, in case of a mixed workload with 50% write commands and 50% read commands with equal and varying command length sizes, the PCIe lane utilization never touched 100% in either direction.

In the case of a mixed workload with more focus on write commands (i.e., 70% write and 30% read, with both higher and lower command lengths for writes), the PCIe downstream lane usage was always lower than 100%. In the case of a mixed workload with more focus on read commands (i.e., 70%/read and 30% write, with both higher and lower command lengths for reads), the PCIe upstream lane usage was always lower than 100%. The data also shows that NAND utilization was never a bottleneck in all workloads, yet PCIe lane utilization is never optimum. Further, the data shows that command length plays a significant role in PCIe lane utilization and overrides the workload type (A, B, and C) in deciding the PCIe lane utilization.

From these experiments, we conclude that PCIe lanes are being underutilized if the memory is not working at full capacity and that, for mixed I/O workload, there is an opportunity for PCIe lane utilization improvement, which is being addressed in the below embodiments. In general, the following embodiments can be used to improve utilization of a communication channel (e.g., a PCIe lane) between a host and the storage system 100, which can improve I/O performance. To maximize utilization of the bus bandwidth for mixed loads, the storage system controller design and/or FTL architecture can be modified. Such optimization was not done in the past, as maximizing PCIe lane utilization was not considered during the performance modeling of an NVMc storage system. The entire perspective of resource optimization and storage system performance was oriented toward maximal usage of internal hardware resources with optimal controller and FTL design.

In one embodiment, the storage system 100 (e.g., the controller 102 or the host command selector 110) includes PCIe lane utilization as a factor when selecting a host command to process from an NVMe queue (e.g., to maximize PCIe lane utilization). This is different from the approach discussed above in which command selection was based on usage of storage system resources alone. By maximizing usage of PCIe lanes, the storage system 100 can offer better balanced performance, especially in a mixed-load pattern. Optionally, secondary factors can be used to combination to further add to the optimization. For example, a weighted priority-based scheme for host command selection can be used in order to maximize the PCIe lane usage for mixed I/O workloads. Such a scheme is referred to below as the Command Priority Factor (CPF) function.

As used herein, the Command Priority Factor (CPF) is a function of PCIe lane usage, workload, length of the command host command priority, type of command, aging of the command, and command dependency with other commands to determine the optimal priority of commands in order to maximize PCIe lane utilization. Expressed as a formula: CPF (Command)=fx(PCIe lane usage, Workload, Command Length, Command priority, Command Type, CommandAgingTime, CommandDependency).

Based on the above experiments, the factors are grouped based on their priorities as follows: Group1 (PCIe Lane usage), Group2 (WorkLoad, Length), and Group3 (Command priority, CommandType, CommandAgingTime, CommandDependency). Expressed as a formula: CPF(Command)=fx(G1,G2,G3), where the priorities among the group is as follows: G1>G2>G3.

Based on the CPF, the command execution of some commands may be prioritized over other commands ensuring better utilization of PCIe lanes. In one embodiment, the CPF is calculated dynamically and is stored in a RAM structure. Based on the CPF, the desired command is chosen for execution.

The CPF can be calculated on arrival of every command based on various factors and corresponding weights assigned to factors. The decision on factors can be made based on the host application. Further, in one embodiment, there are no fixed weight that applies to all patterns (hence, the factors can be tuned by firmware based on the experiments). However, it may be desired that PCIe lane usage be given the highest priority, with the next highest priorities being from workload and length. The remaining factors can be tuned, and an appropriate ratio for the last group can be arrived on from repeated experiments.

As such, in this example:

CPF(Command)=fx(Group1_Weightage*Fx(PCIe lane usage)+Group2_Weightage*Fx(command length,Workload)+Group3_Weightage*Fx(CommandType,CommandPriority CommandAgingTime,CommandDependency)).

A CPF module can be used to calculate the Command Priority Factor per command on arrival of every NVMe command and store the weighted value of the command in a CPF table. (As mentioned above, a "module" can take various forms, and further examples of how a CPF module can be implemented are discussed below.) The CPF weight can be tagged to a command identifier (ID) in the CPF table and can be sorted in order of highest to lowest CPF weight.

As mentioned above, in this example, the CPF is a function of PCIe lane usage, workload, length of the command, host command priority, type of command, and aging of the command to determine the optimal priority of commands in order to maximize PCIe lane utilization. On calculation of the weight for every command, a command descriptor of the command with the highest weight is forwarded to the FTL for further processing. The command descriptor can store details of the command such as the command ID, command type, length of the command, startAddress, BufferPointer, chunkId, etc.

Figure 5:
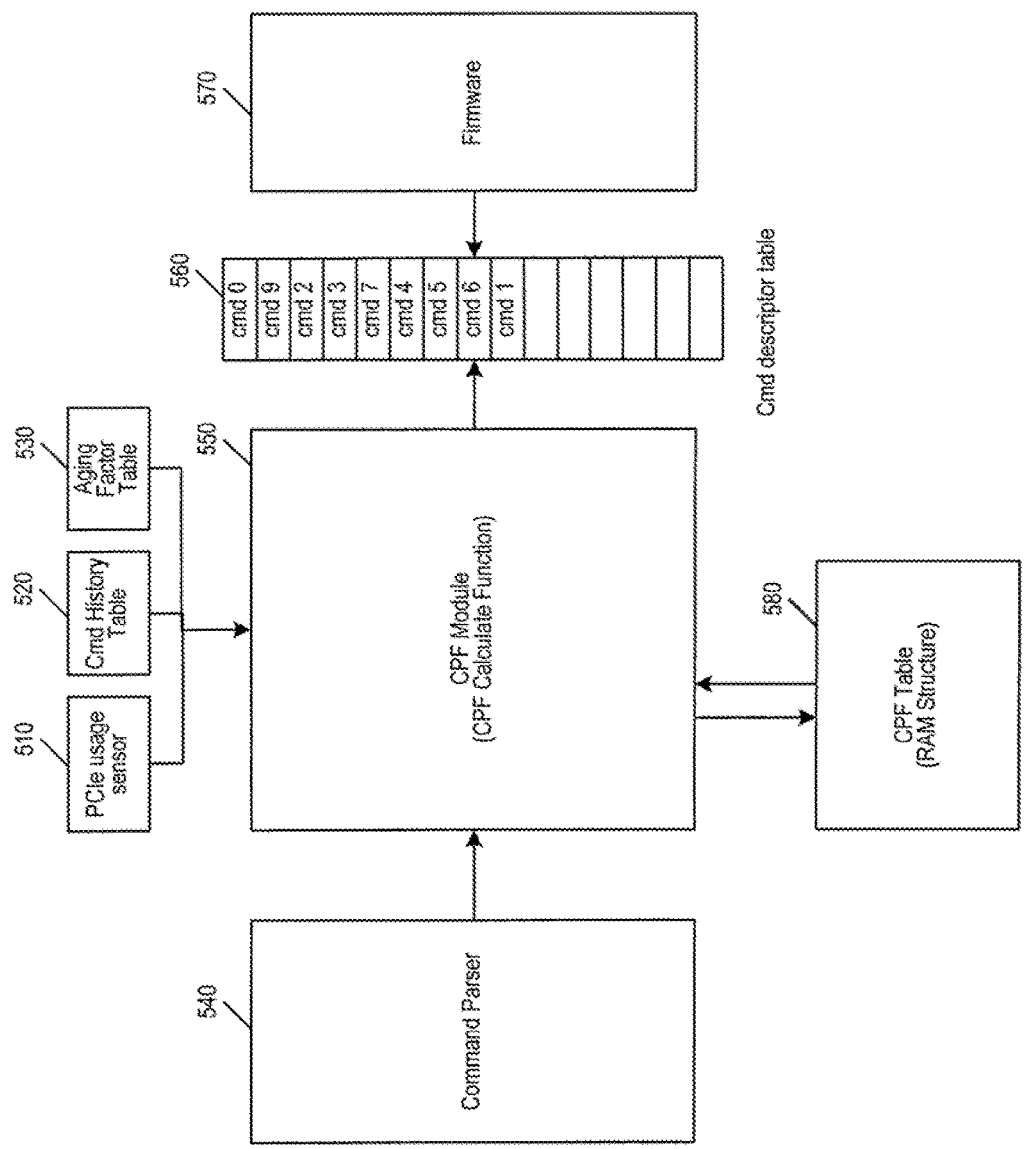
FIG. 5 is a block diagram of an embodiment for improving utilization of a communication channel between a host and a storage system.

FIG. 5 is a block diagram of one example implementation of the above embodiment. As shown in FIG. 5, in this example, the CPF module 550 receives, as inputs, data from a PCIe usage sensor 510, a command history table 520, and an aging factor table 530. The CPF module 550 stores data in the CPF table 580, as noted above. With input from the command parser 540, the CPF module 550 stores a value in the command descriptor table 560, which is also accessed by the firmware 570.

As mentioned above, the CPF module can take various forms. For example, in one embodiment, the CPF module 550 is implemented as part of the controller 102, whereas, in another embodiment, the CPF module 550 is implemented as part of the firmware. The following paragraphs will describe these alternatives.

Figure 6:
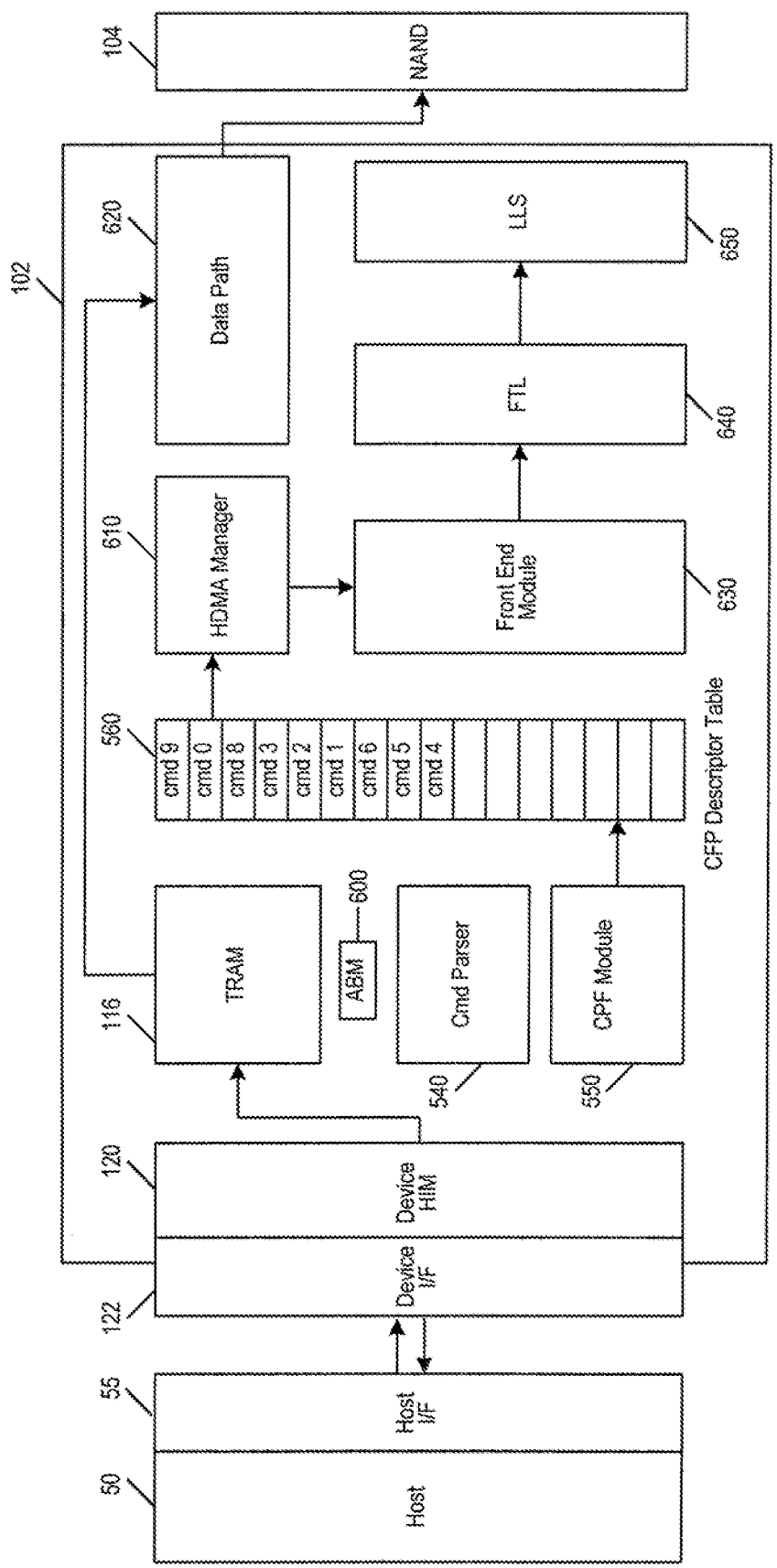
FIG. 6 is a block diagram of an embodiment in which a Command Priority Factor module is part of a storage system controller.

Returning to the drawings, FIG. 6 is a block diagram of an embodiment in which the CPF module 550 is part of the storage system's controller 102 and communicates with a CPF descriptor table 560 in the controller 102. FIG. 6 shows other example components of the controller 102, many of which were shown in previous figures and discussed above. FIG. 6 also shows that the controller 102 can comprise an arbitration module (ABM)600, a horizontal direct memory access (HDMA) manager 610, a data path 620, a front end module 620, a flash translation layer (FTL) 640, and a low-level system (LLS) module 650. FIG. 6 also shows that the host 50 comprises a host interface 55 that communicates with the storage system/device interface 122.

Figure 7:
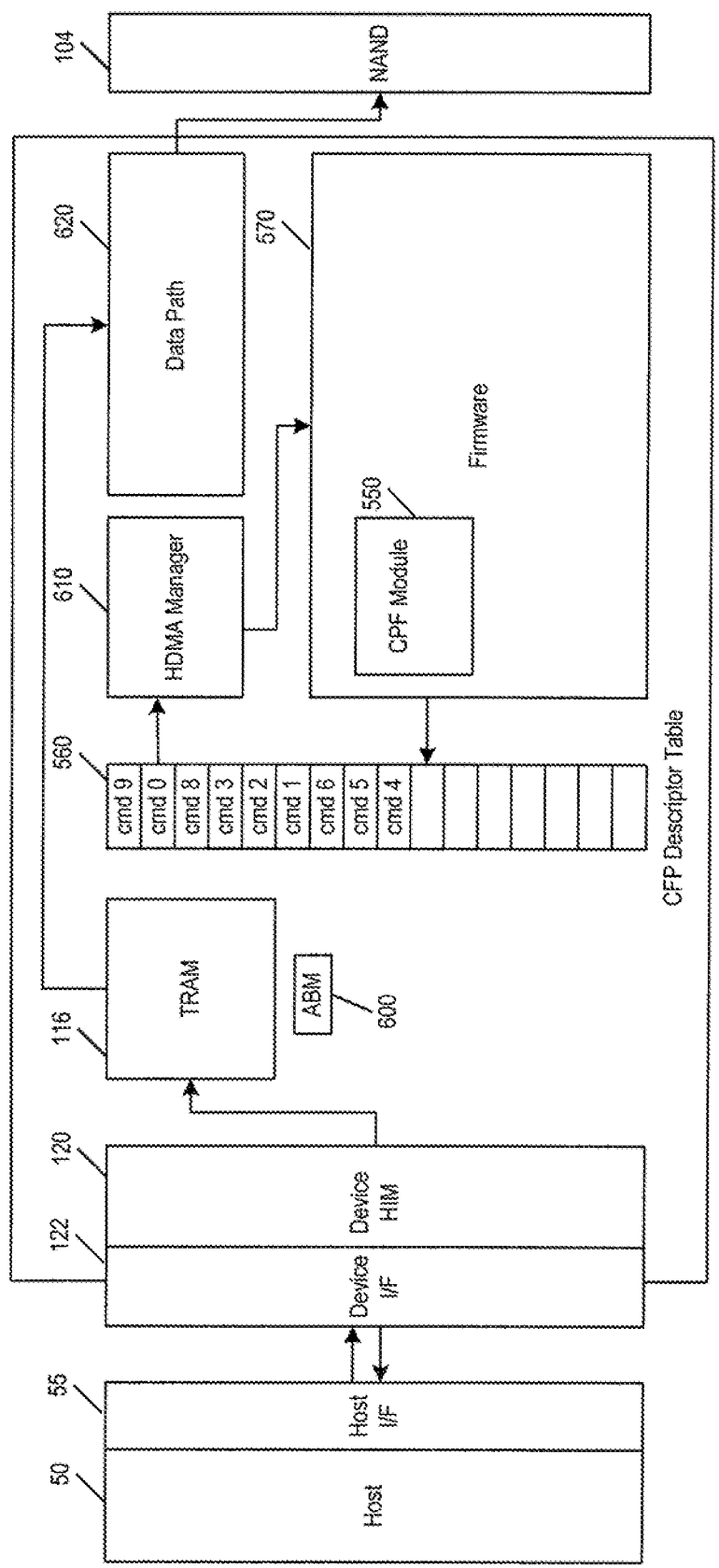
FIG. 7 is a block diagram of an embodiment in which a Command Priority Factor module is part of firmware in a storage system.

Returning again to the drawings, FIG. 7 is a block diagram of an embodiment in which the CPF module 550 is part of the storage system's firmware 570. The other components in this drawing are as described above.

Irrespective of where the CPF module is located or how it is implemented, the CPF calculation can be performed in any suitable way. For example, as noted above, the CPF calculation can include one or more of the following factors: PCIe lane usage percentage, workload, length of the command, command priority, type of command, and aging of the command. The workload parameter can be determined by observing the command history. Every group can be assigned a weight that can be dynamically altered to suit varying use cases of the storage system, as follows:

CPF (Command)=$fX$(Group1_Weightage*$Fx$(PCIe lane usage)+Group2_Weightage*$Fx$(Command length,Workload)+Group3_Weghtage*$Fx$(CommandType,CommandPriority,CommandAgingTime,CommandDependency))

Figure 8:
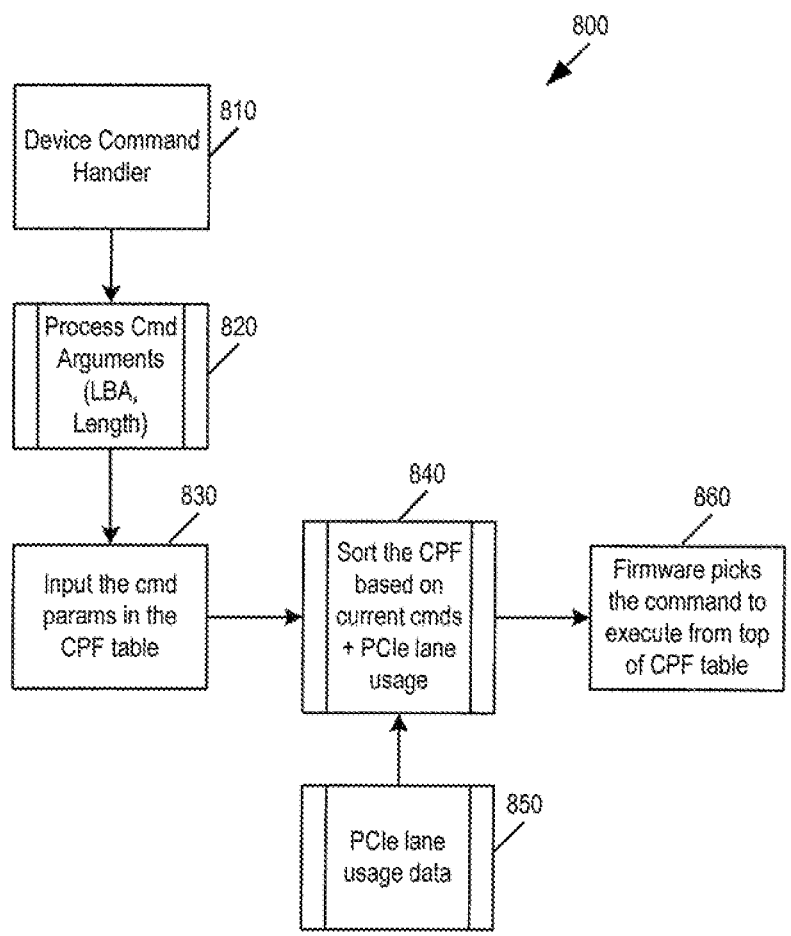
FIG. 8 is a flow chart that describes an operation of a Command Priority Factor module of an embodiment.

Turning again to the drawings, FIG. 8 is a flow chart 800 that describes the operation of a CPF module of an embodiment. As shown in FIG. 8, a device command handler 810 processes command arguments, such as logical block address and length (act 820). Next, the command parameters are inputted into a CPF table (act 830). The CPF table is then sorted based on the current commands and the PCIe lane usage (act 840), based on PCIe lane usage data 850. The firmware then picks the command to execute from the top of the CPF table (act 860).

Figure 9:
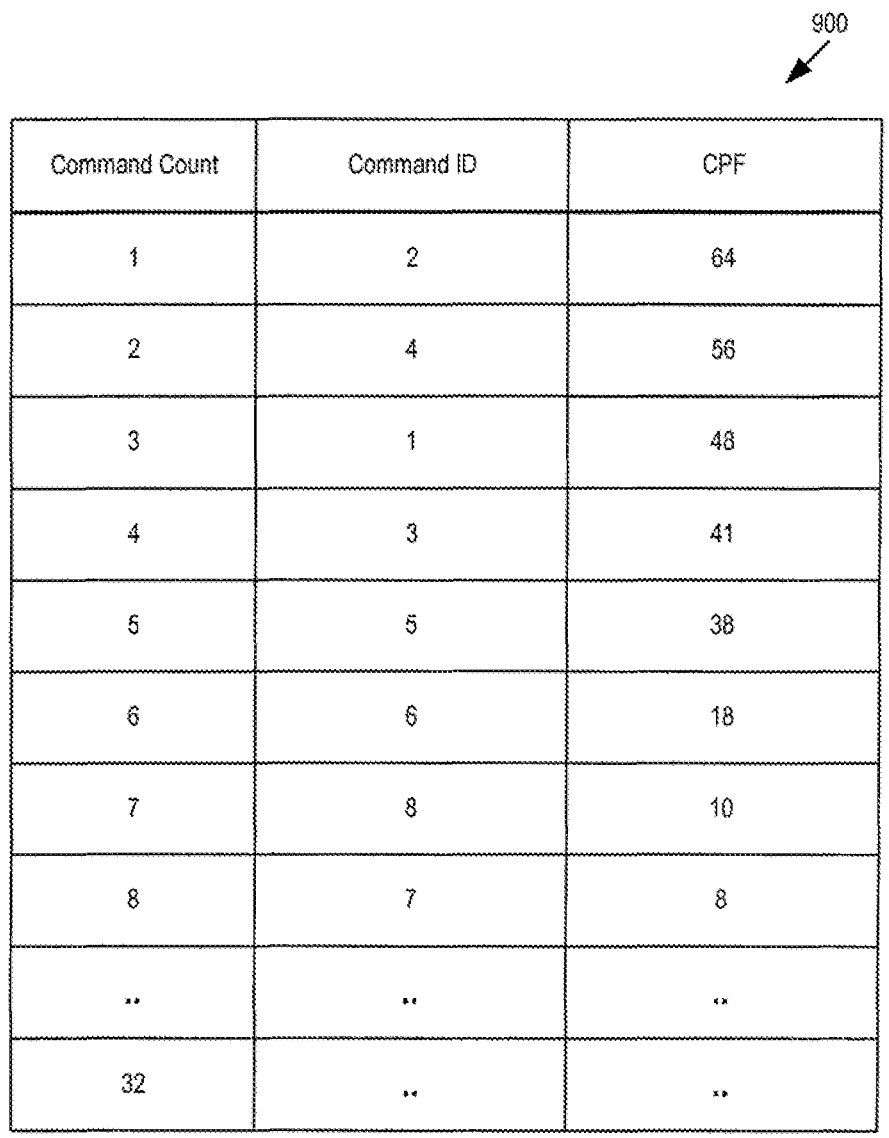
FIG. 9 is an illustration of a Command Priority Factor table of an embodiment.

Returning again to the drawings, FIG. 9 is an illustration of a CPF table 900 of an embodiment. As shown in FIG. 9, in this embodiment, the CPF table 900 comprises a command count, a Command ID, and a CPF column. Accordingly, the Command ID and its corresponding CPF are maintained as part of the CPF table 900. The size of CPF table 900 depends on the NVMe submission queue size and, hence, is variable in nature. If the CPF table 900 is stored in sorted order, in order of the highest weight assigned command to the lowest, the FTL can pick the command from the top. On execution of the command, the entry can be cleared from the table. On addition of a new entry, the CPF table 900 can be re-sorted to maintain the weight-based sorted order. The CPF table 900 can also be implemented as a doubly-linked list that can expand dynamically based on the decided submission queue size.

There are several advantages associated with these embodiments. Consider, for example, mixed workload use cases for storage systems whose queue depth is large, and many commands may not be processed even if the upstream or downstream lane is free. Although NVMEe allows out of order execution, PCIe lane usage is not considered during command selection in prior approaches. Especially with a large NVMe queue depth, such as 128 and more, there is a possibility that the PCIe lanes may not be fully utilized. The embodiments presented above ensures the improved input-output operations per second (IOPS) for mixed workloads in various scenarios, such as enterprise devices, cell phones, and client devices, and, in the case of pure workload, it offers the same IOPS performance as current methods.

Figure 10:
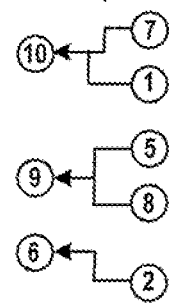
FIG. 10 is diagram illustrating advantages of an embodiment.

Forsake of illustration, consider an NVMe queue with 10 commands and an NVMe queue size of greater than 32 commands. The amount of dependency and corresponding wait is higher as the queue depth increases. Greater utilization of PCIe bus bandwidth will ensure higher throughput for the host. Storage systems will perform better on most benchmarks due to improved bus utilization with minimal cost. FIG. 10 illustrates how these embodiments can provide such improvements.

As storage systems tend to get faster and adopt higher queuing mechanisms, effective utilization of the host bus may be desired. These embodiments can be seen in light of usage of faster storage systems that have multiple cores and faster memory, such as Storage Class Memory. Greater utilization of the host bus may be desired to keep the storage system busy and, thus, prevent bus usage from becoming the bottleneck.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for improving utilization of a communication channel between a host and a storage system, the method comprising:
   performing the following in a storage system in communication with a host via a communication channel, wherein the storage system comprises a memory:
      determining a plurality of factors based on a host application, wherein the plurality of factors comprises a utilization of the communication channel, a workload indicating a number of read commands versus write commands, and a command length;

assigning a weight to each of the plurality of factors, which is tuned by firmware in the storage system based on experiments, wherein utilization of the communication channel is assigned a highest weight and one or both of workload and command length is assigned a next-highest weight receiving a plurality of commands from the host;

dynamically calculating a command priority factor for each command of the plurality of commands in response to arrival of the command using a weighted priority-based function based on the plurality of factors and assigned weights;

storing the plurality of commands in a queue in an order in which the plurality of commands was received by the storage system, wherein the plurality of commands comprise read commands and write commands with overlapping address ranges and the order in which the plurality of commands was received requires that a first set of write commands in the plurality of commands be executed before certain other write and/or read commands in the plurality of commands due to dependency that the certain other write and/or read commands have on the first set of write commands;

storing the command priority factors for each command of the plurality of commands in a data structure, wherein each command priority factor is tagged to a command identifier in the data structure;

selecting commands for execution from the queue in descending command priority factor order, which is different from the order in which the plurality of commands was received and provides greater utilization of the communication channel than the order in which the plurality of commands was received; and executing the plurality of commands in descending command priority factor order, wherein the first set of write commands in the plurality of commands is executed before the certain other write and/or read commands in the plurality of commands due to the dependency.

2. The method of claim 1, wherein the selecting is performed in a hardware component in a controller of the storage system.

3. The method of claim 1, wherein the and selecting is performed in firmware in the storage system.

4. The method of claim 1, wherein the communication channel comprises a full duplex communication channel.

5. The method of claim 1, wherein the communication channel comprises a peripheral component interconnect express (PCIe) interface.

6. The method of claim 1, further comprising sorting entries of the data structure to identify the highest command priority factor.

7. A storage system comprising:
a memory; and
a controller configured to be in communication with the memory, wherein the controller is further configured to:
determine a plurality of factors based on a host application, wherein the plurality of factors comprises a utilization of a the communication channel, a workload indicating a number of read commands versus write commands, and a command length;
assign a weight to each of the plurality of factors, which is tuned by firmware in the storage system based on experiments, wherein utilization of the communication channel is assigned a highest weight and one or both of workload and command length is assigned a next-highest weight;
receive a plurality of commands from the host;
dynamically calculate a command priority factor for each command of the plurality of commands in response to arrival of the command using a weighted priority-based function based on the plurality of factors and assigned weights;
store the plurality of commands in a queue in an order in which the plurality of commands was received by the storage system, wherein the plurality of commands comprise read commands and write commands with overlapping address ranges and the order in which the plurality of commands was received requires that a first set of write commands in the plurality of commands be executed before certain other write and/or read commands in the plurality of commands due to dependency that the certain other write and/or read commands have on the first set of write commands;
store the command priority factors for each command of the plurality of commands in a data structure, wherein each command priority factor is tagged to a command identifier in the data structure;
select commands for execution from the queue in descending command priority factor order, which is different from the order in which the plurality of commands was received and provides greater utilization of the communication channel than the order in which the plurality of commands was received; and
execute the plurality of commands in descending command priority factor order, wherein the first set of write commands in the plurality of commands is executed before the certain other write and/or read commands in the plurality of commands due to the dependency.

8. The storage system of claim 7, wherein the communication channel comprises a full duplex bus.

9. The storage system of claim 7, wherein the communication channel comprises a peripheral component interconnect express (PCIe) interface.

10. The storage system of claim 7, wherein the memory comprises a three-dimensional memory.

11. The storage system of claim 7, wherein the storage system is configured to be integrated in the host.

12. The storage system of claim 7, wherein the storage system is configured to be removably connected with the host.

13. The storage system of claim 7, wherein the controller is further configured to sort entries of the data structure to identify the highest command priority factor.

14. A storage system comprising:
a memory;
a processor;
means for causing the processor to determine a plurality of factors based on a host application, wherein the plurality of factors comprises a utilization of a communication channel, a workload indicating a number of read commands versus write commands, and a command length;
means for causing the processor to assign a weight to each of the plurality of factors, which is tuned by firmware in the storage system based on experiments, wherein utilization of the communication channel is assigned a highest weight and one or both of workload and command length is assigned a next-highest weight;

means for causing the processor to receive a plurality of commands from the host;

means for causing the processor to dynamically calculate a command priority factor for each command of the plurality of commands in response to arrival of the command using a weighted priority-based function based on the plurality of factors and assigned weights;

means for causing the processor to store the plurality of commands in a queue in an order in which the plurality of commands was received by the storage system, wherein the plurality of commands comprise read commands and write commands with overlapping address ranges and the order in which the plurality of commands was received requires that a first set of write commands in the plurality of commands be executed before certain other write and/or read commands in the plurality of commands due to dependency that the certain other write and/or read commands have on the first set of write commands;

means for causing the processor to store the command priority factors for each command of the plurality of commands in a data structure, wherein each command priority factor is tagged to a command identifier in the data structure;

means for causing the processor to select commands for execution from the queue in descending command priority factor order, which is different from the order in which the plurality of commands was received and provides greater utilization of the communication channel than the order in which the plurality of commands was received; and means for causing the processor to execute the plurality of commands in descending command priority factor order, wherein the first set of write commands in the plurality of commands is executed before the certain other write and/or read commands in the plurality of commands due to the dependency.

\* \* \* \* \*